(No Model.) 8 Sheets—Sheet 1.

J. H. SWIFT.
BOX NAILING MACHINE.

No. 344,419. Patented June 29, 1886.

Witnesses:
Geo. W. Miatt
Wm Gardner

Inventor:
Joseph H. Swift,
by Paul H. Bate,
Attorney.

(No Model.)
8 Sheets—Sheet 2.

J. H. SWIFT.
BOX NAILING MACHINE.

No. 344,419. Patented June 29, 1886.

Witnesses:
Geo. W. Miatt
Wm Gardner

Inventor
Joseph H. Swift,
by Paul H. Bate,
Attorney (No Model.) 8 Sheets—Sheet 3.

J. H. SWIFT.
BOX NAILING MACHINE.

No. 344,419. Patented June 29, 1886.

Witnesses:
Geo. W. Miatt
Wm Gardner

Inventor:
Joseph H. Swift,
by Paul H. Bate,
Attorney.

(No Model.) 8 Sheets—Sheet 4.

J. H. SWIFT.
BOX NAILING MACHINE.

No. 344,419. Patented June 29, 1886.

(No Model.)　　　　　　　　　　　　　　　　　　　　8 Sheets—Sheet 6.
J. H. SWIFT.
BOX NAILING MACHINE.

No. 344,419.　　　　　　　　　　　Patented June 29, 1886.

(No Model.) 8 Sheets—Sheet 8.
J. H. SWIFT.
BOX NAILING MACHINE.
No. 344,419. Patented June 29, 1886.
*Figure 8.*
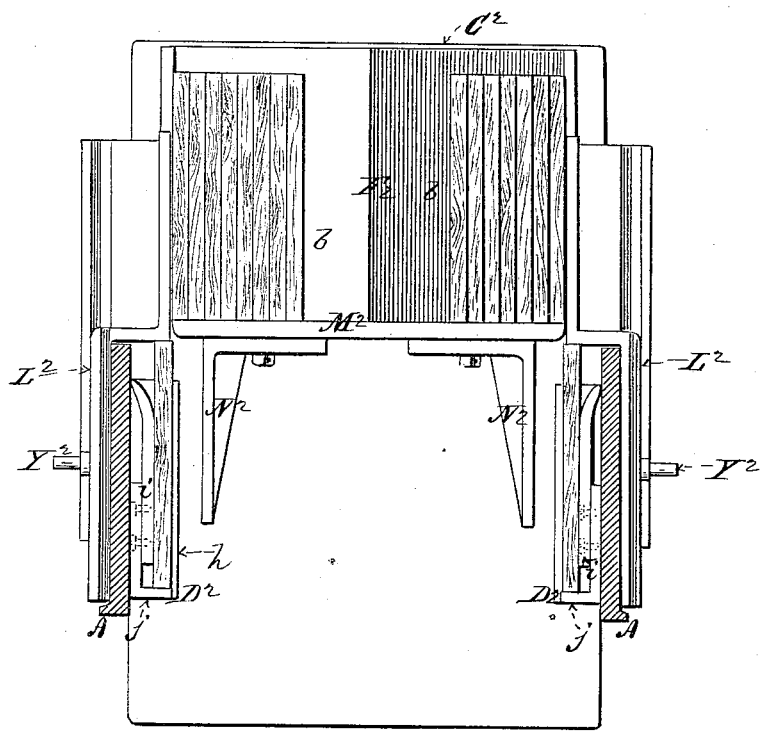
*Figure 9.* *Figure 10.*
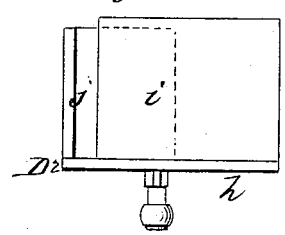 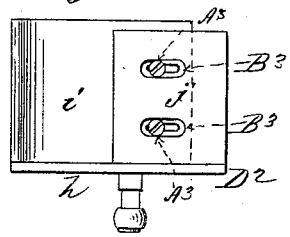
Witnesses: Inventor:
Geo. W. Miatt Joseph H. Swift
Wm Gardner by Paul H. Bate
 Attorney

UNITED STATES PATENT OFFICE.

JOSEPH H. SWIFT, OF BROOKLYN, NEW YORK.

BOX-NAILING MACHINE.

SPECIFICATION forming part of Letters Patent No. 344,419, dated June 29, 1886.

Application filed August 12, 1884. Serial No. 140,309. (No model.)

*To all whom it may concern:*

Be it known that I, JOSEPH H. SWIFT, a citizen of the United States, and residing in the city of Brooklyn, county of Kings, and State of New York, have invented certain new and useful Improvements in Box-Nailing Machines, of which the following is a specification, reference being had to the accompanying drawings.

The invention consists, first, in providing a box-nailing machine for nailing both ends of the box or box-frame at the same instant and by one operation with nail-driving mechanism capable of such adjustment that the same machine may be used in nailing boxes of different lengths or sizes; secondly, in providing such a machine with mechanism for automatically conveying into proper position for nailing the end pieces of the box or box-frame from the special support provided for the same; thirdly, in so forming the nail-boxes that they may act as guides for the box or box-frame during the operation of nailing, and, fourthly, in providing such a machine with certain devices for limiting the position of the box or box-frame, or the different pieces thereof, during the operation of nailing.

Figure 1:
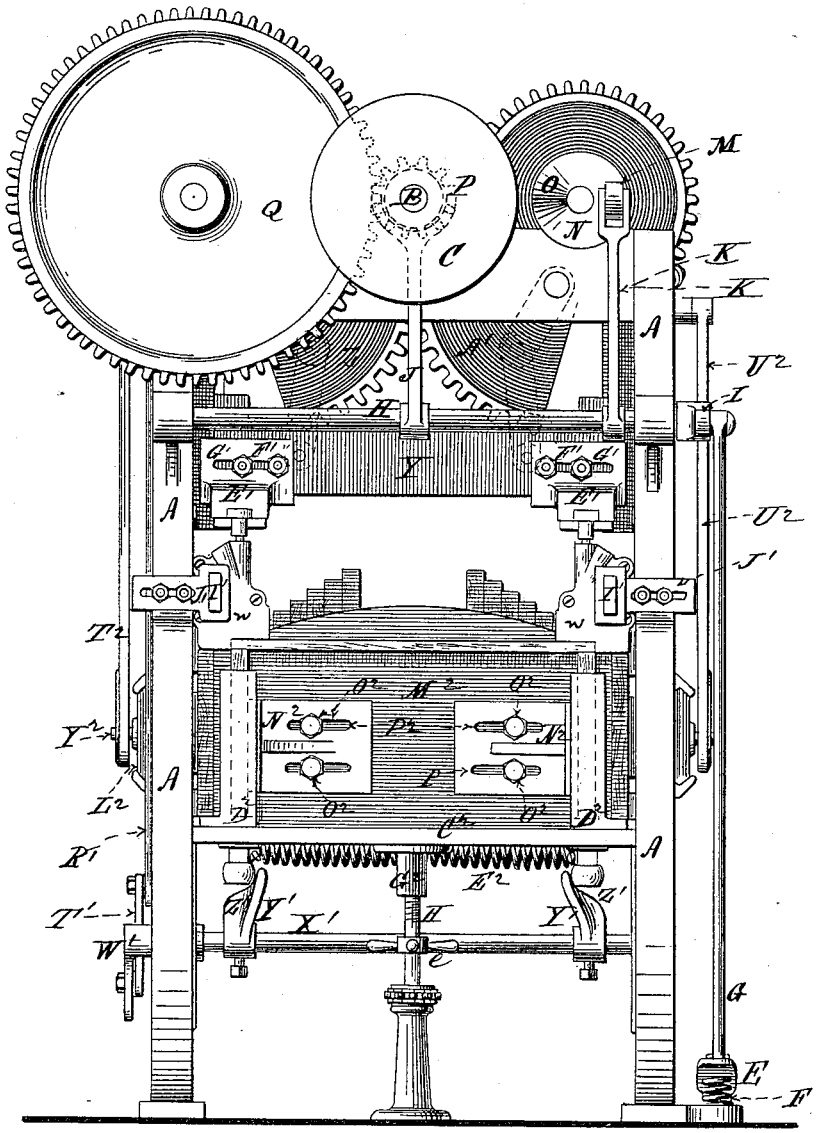
Figure 2:
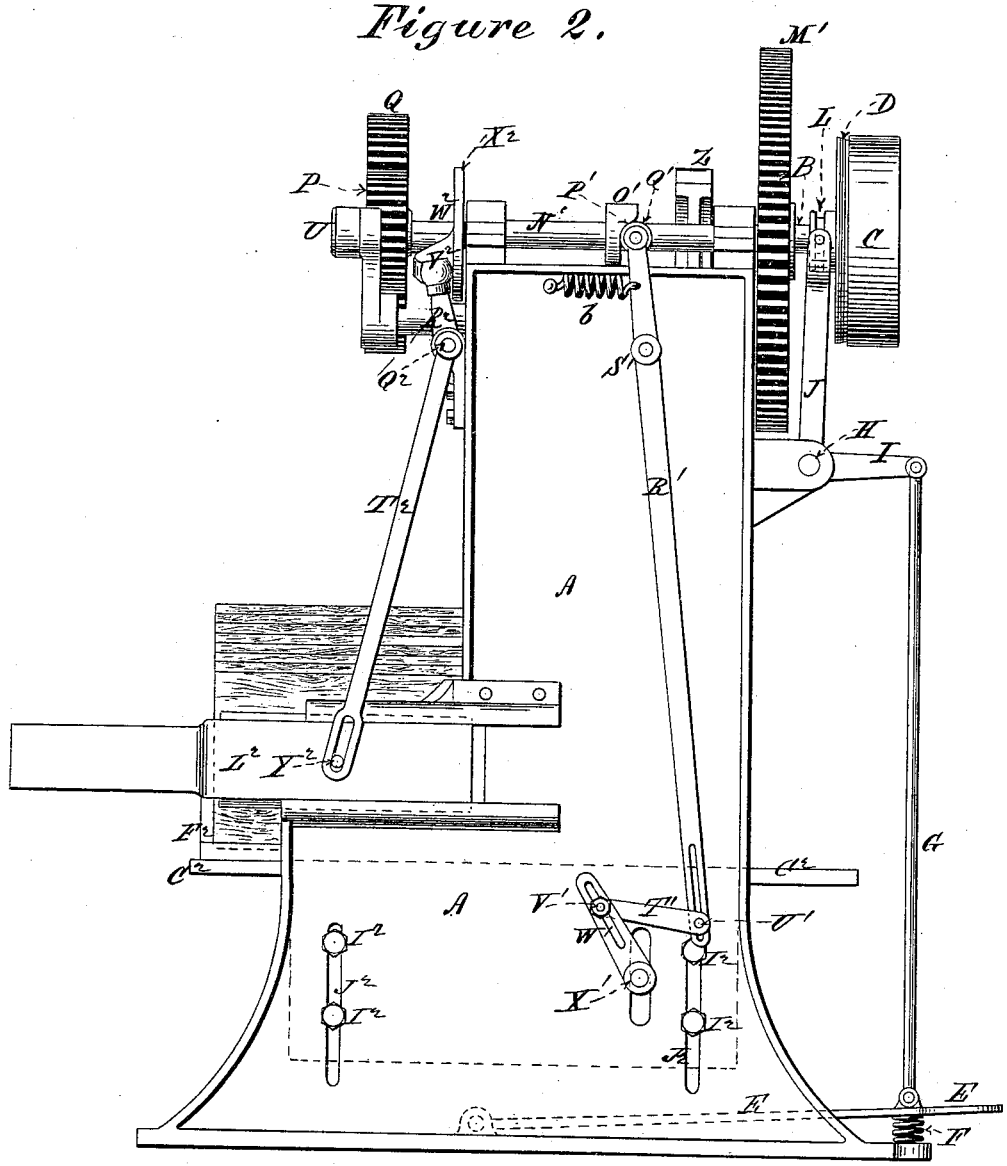
Figure 3:
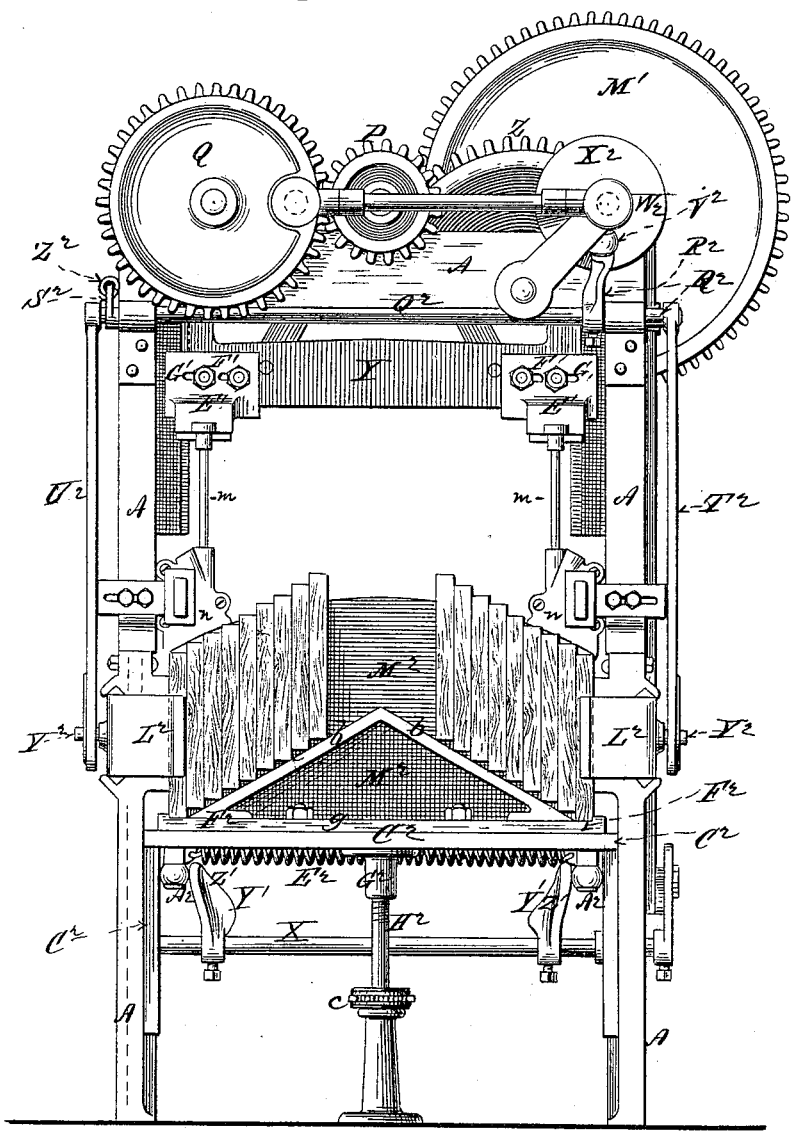
Figure 4:
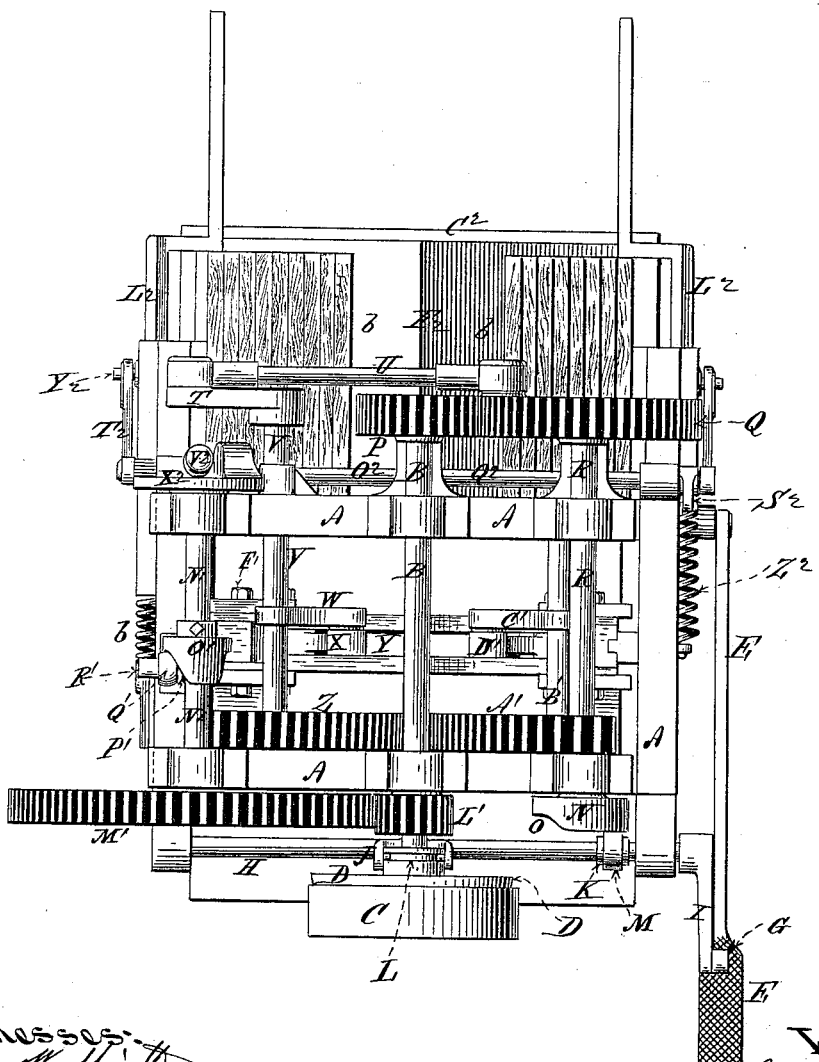
Figure 5:
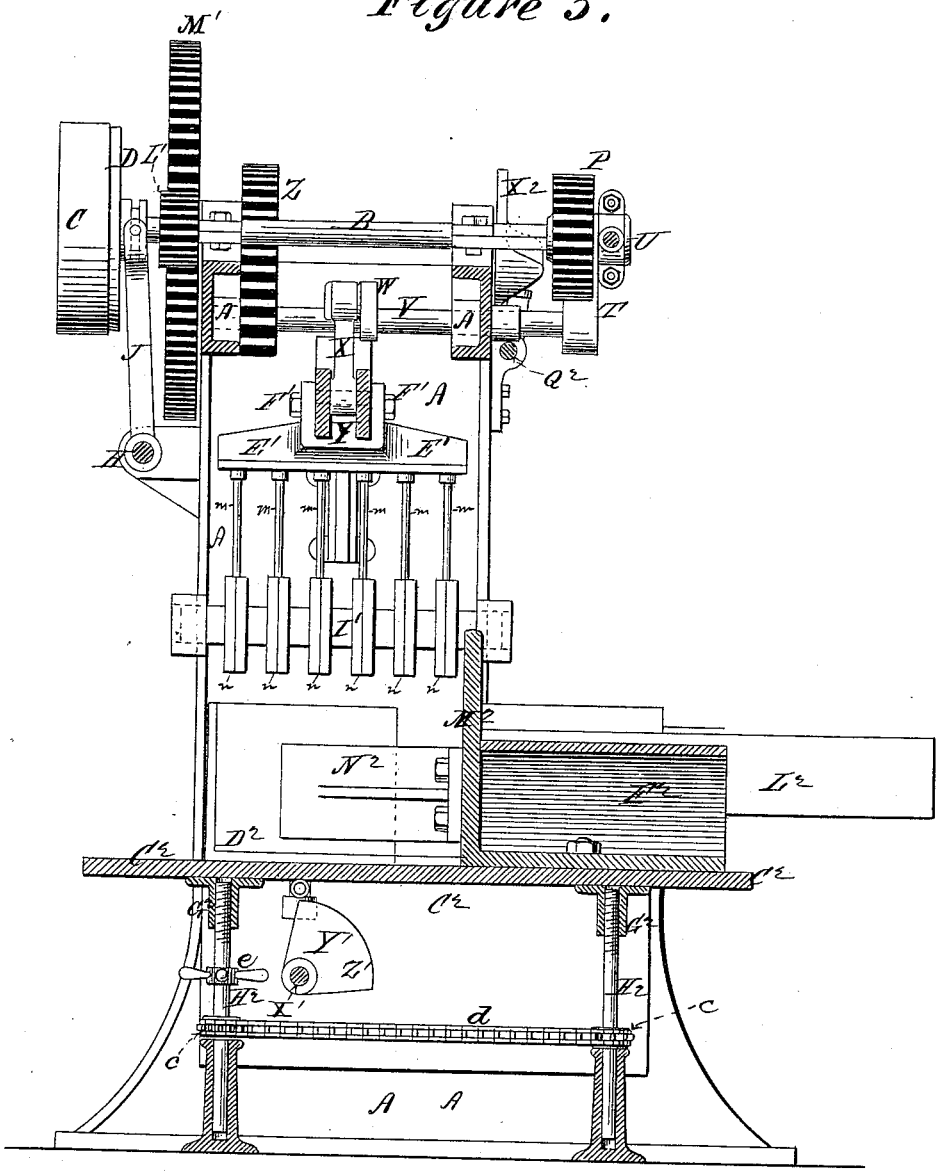
Figure 6:
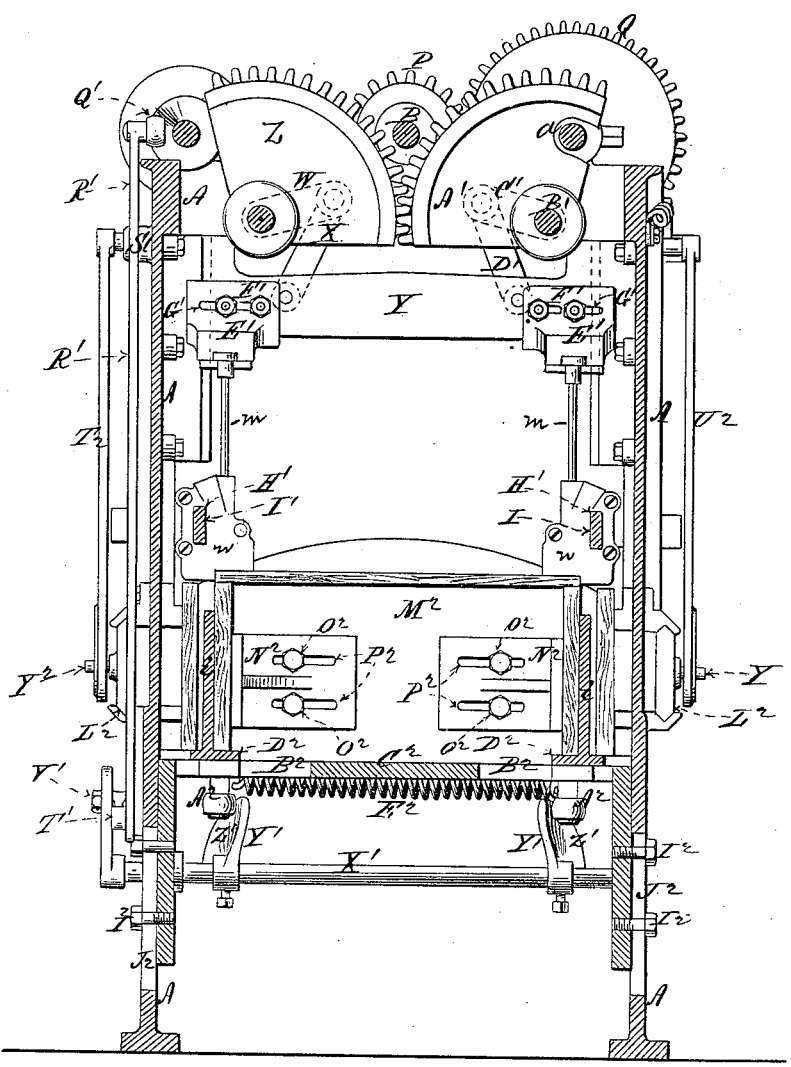
Figure 7:
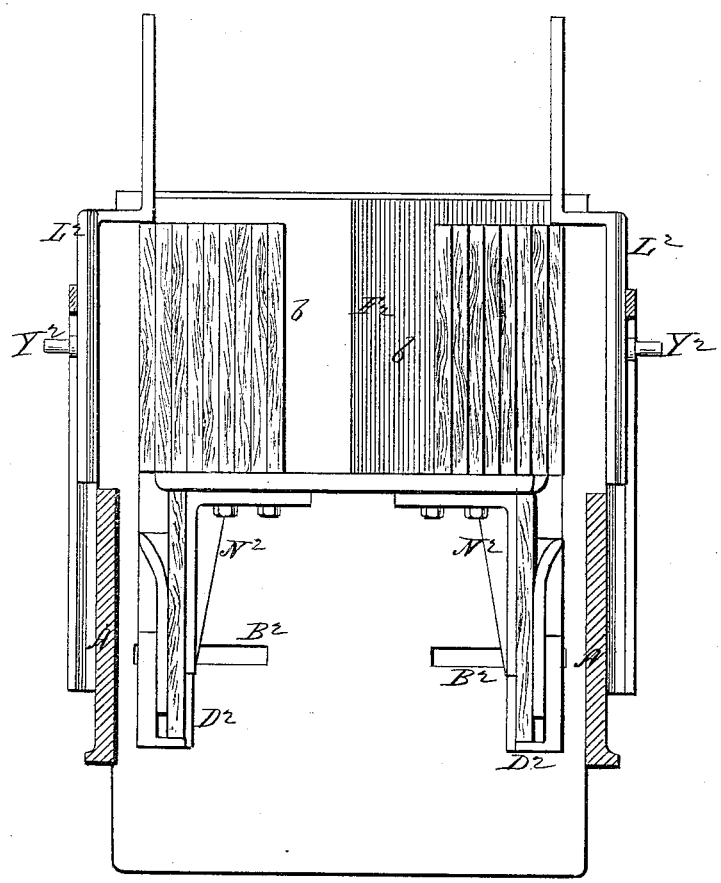

In the accompanying drawings, Figure 1 is intended to represent a front view of the machine. Fig. 2, a side view; Fig. 3, a back view; Fig. 4, a top view, but not including the nail-feeder or nail-tubes; Fig. 5, a view in central sectional elevation; Fig. 6, a view in central sectional elevation, at right angles to the view shown in Fig. 5; Figs 7 and 8, views in horizontal section showing the special support or rest for the end-pieces of the box or box-frame, the end piece forwarder, the end-piece carrier, and the shoulders or supports secured to the back plate; and Figs. 9 and 10 detail views of opposite sides of the end piece carrier.

The nail-feeeder and nail-tubes are not shown in the drawings, there being several well-known forms of the same, and several well-known ways of applying the same to box-nailing machines.

In operating my invention a frame A, Fig. 1, of iron or other suitable material, is provided, and on the top of this frame is supported a shaft, B, Fig. 4, the journals of which shaft rest in suitable bearings, the said shaft having at the front end a driving-pulley, C, which is driven by a belt from any suitable driving-power. The driving-pulley is loose on the shaft B, and has a conical recess in it, into which fits a conical friction-pulley, D. The friction-pulley is so secured to the shaft B that when forced into the conical recess in the driving-pulley, and so made to revolve, the said shaft B is caused to revolve with it. The said friction-pulley is operated back and forth on the shaft B, being feathered thereon, into and out of the conical recess in the driving-pulley, by means of a foot-piece, E, Fig. 2, a retracting-spring, F, a connecting-rod, G, and a rock-shaft, H, with its arms I and J, the said rock-shaft being supported in bearings on the frame A, and having a horizontal arm, I, secured to the connecting-rod G, and two vertical arms, J and K, respectively. The hub of the friction-pulley has an annular groove, L, and the fork, in which the arm J terminates, has at each of its upper ends a pin projecting inwardly, and intended to operate in the said groove L, for the purpose of forcing the friction-pulley in and out of the driving-pulley. The vertical arm K, Fig. 1, of the said rock-shaft has in its upper and terminating end a roller, M, which is intended to press or rest against the cam N, and to roll into the depression O, Fig. 4, in said cam. A pinion, P, Fig. 4, at the other end of the shaft B from the driving-pulley C, drives the cog-wheel Q on the end of a shaft, R, and so gives motion to the latter. On the other end of the shaft R is the cam N, before referred to. Motion is communicated from the cog-wheel Q to the rocker-arm T by means of the pitman U, which has two wrist-connections, respectively, one made with the cog-wheel Q near its rim and the other with the said rocker-arm T. The rocker-arm T is secured to the rock-shaft V, which latter has another rocker-arm, W, Figs. 4 and 6, secured to it, and this latter rocker-arm W is connected by means of a wrist-connection with a link, X, the lower end of which link is pivoted between the two flanges of the cross-head Y, Fig. 6. There is a segmental gear, Z, Figs. 4 and 6, on the rock-shaft V, and from such segmental gear motion is communicated to another segmental gear, A', provided with a notch, a, so as to enable it to rock back and forth on a rock-shaft, B', without coming in contact with the shaft R. The latter rock-shaft, B', similar to the rock-shaft V, has secured to it a rocker-arm, C', Fig. 6, which is connected by means of a wrist-connection with a link, D', which link, like the link X, is pivoted between the two flanges of the cross-head Y, the purpose and intention being that the two segmental gears, together with the rocker-arms W and C' and the links X and D', shall work in unison, intermittently depressing and elevating the cross-head. The cross-head at each end moves up and down a suitable way.

As shown in Figs. 1 and 5, the cross-head is provided at or near each end with a nail-punch holder, E', which is formed preferably of metal, and which is secured to the cross-head by means of the set-screws F', which pass through the elongated slot G' in the overlapping flange of such holder on each side of the cross-head and screw into the latter. Such nail-punch holders are so formed that the desired number of nail-punches $m$, two or more, may, in the case of each such holder, be suspended in and form a groove in the lower part of the holder, substantially as shown, there being thus provided a set or series of nail-punches on each side of the machine. The position of the nail-punch holders themselves may be adjusted along the length of the cross-head by removing or loosening the set-screws, and then pushing such holders back or forth on the cross-head, the limit of such motion being fixed by the length of the elongated slots G', and then by tightening the set-screws when such holders are in the desired position. The ability to make such adjustments of the position of the nail-holders is desirable when it is intended to use the same machine in nailing boxes of different lengths.

The nails are fed to the nail-boxes through tubes from a suitable nail-feeder in any of the well-known ways.

The nail-boxes, which are formed with a shoulder on their under side, as shown in Figs. 1 and 6, so as to act as guides for the box or box-frame to be nailed, are capable of being adjusted as to their position, so as to co-operate with the nail-punches according to the position occupied by the latter, the number of the nail-boxes and of the nail-punches being the same. Other forms of nail-boxes than those described may, however, be used.

The nail-boxes $n$ have mortises H', through which they are slid into position on a supporting-bar, I', Figs. 5 and 6, and there properly secured by means of set-screws, and such supporting-bar is itself supported, as shown in Fig. 1, by means of two projecting bars, J', one at each end, formed as shown, and secured to the frame A by means of set-screws passing through the elongated slots in the bars J'. By means of such elongated slots and set-screws the position of the bar I' and the nail-boxes thereby supported may be adjusted with reference to the position to be occupied by the nail-punches, which latter are not wholly withdrawn from the nail-boxes, it being thereby rendered necessary to adjust the position of both the nail-boxes and the nail-punches at the same time.

The pinion L', Fig. 4, on shaft B, communicates motion to the cog-wheel M' on the shaft N', which latter shaft is thereby caused to revolve, carrying with it the cam O', which is secured to it, and which is provided with the depression P', Figs. 2 and 4, into which depression the roller Q', held in the forked end of the lever R', rolls at the proper intervals, through the action of the spring $b$, which is secured to the lever R' and to the frame A, Fig. 2. The gearing is so timed that the shaft N' will only make one revolution to two revolutions made by the shaft R.

At the lower end of the lever R', Fig. 2, which is pivoted to the frame A at S', is an elongated slot, and in such slot one end of the link T' is secured by means of an adjustable pivot, U'. The other end of the link T' is secured to the rocker-arm W' by means of another adjustable pivot, V', the rocker-arm itself being secured to the rocking cam-shaft X', which extends through slots in the downwardly-projecting side pieces of the table $C^2$, and rests in suitable bearings on each side of the frame A. The rocking cam-shaft X' has secured to it at proper intervals two cams, Y', Fig. 1, provided with suitable inclines, Z', which cams operate against the projections $A^2$, extending down through elongated slots $B^2$ in the table $C^2$ from the end-piece carriers $D^2$, Figs. 6 and 7. The motion of the lever R' is controlled by the cam O', (which is so timed as to cause the end-piece carriers to move forward during every second elevation of the cross-head, and to move back during the depression of the cross-head succeeding every such second elevation, as hereinafter explained,) and by the spring $b$. The said lever R', thus controlled and acting through the intermediate parts, causes the cam-rocking shaft X' to rock, together with its supported cams Y', thereby controlling, in combination with the spring $E^2$, the position of the end-piece carriers $D^2$.

A table or other suitable support, $C^2$, Figs. 3 and 5, for supporting the box or box-frame or the different parts or pieces thereof during the operation of nailing, and extending back far enough to furnish space for the special support or rest $F^2$, for the end pieces of the box, is provided, and is placed in proper position with reference to the nail-boxes. Such table is provided on its under side with stationary nuts $G^2$, which are intended to form part of the vertical screws $H^2$, used in elevating or depressing the table $C^2$, each of the said vertical screws having a sprocket-wheel, $c$, and the said wheels being connected by means of a sprocket-chain, $d$. Motion is imparted to the said vertical screws by means of the hand-wheel $e$, Fig. 5.

The table $C^2$ is held in any desired position by means of the set-screws I², Fig. 2, which pass through the elongated slots J² in the frame A, and screw into the downwardly-projecting side pieces of the table C², the said slots allowing of all necessary vertical adjustment.

Under the table C² there is arranged a spiral spring, E², Fig. 6, connecting at each end with one of the projections A², extending down through the slots B² in the table C² from the end-piece carriers, the purpose of which spring E² is to pull toward each other, and into proper position for nailing at the proper intervals, the two carriers containing the end pieces of the box, which end pieces have been brought forward by means of the forwarders L² from the special rest or support F², Fig. 3, provided for such end pieces, and which is bolted to the back part of the table C². The rest or support F² is made in the form of a double-inclined plane, $b$, with a base, $g$, (the back plate, M², referred to hereinafter serving as a back,) the end pieces of the box being placed on end on such support F², and resting against the back plate of the table. The end pieces follow one another down the incline, as required, either because of gravity or because of pressure of any suitable kind, such as weights, for instance. A back plate, M², substantially as shown in Fig. 1, is provided for the table C², the same being formed preferably of metal, and secured in any suitable manner to the table, and being so located on the table as to limit the position in one direction of the different parts or pieces of the box or box-frame supported by the latter and without interfering with the operation of the forwarders L². The back plate also serves as part of the special support or rest for the end pieces of the box. Shoulders or supports N², sufficiently long to act as supports and at the same time capable of being used with end pieces of different lengths, and substantially as shown in Figs. 1 and 7, are also provided, the same being adjustable on and removable from the back plate by means of set-screws O² and elongated slots P² in the back plate, the purpose of such shoulders or supports being to limit the position of the end pieces of the box on the table, and to furnish a support for the same before and while being nailed.

At the rear of the frame A, and near the top, there is a rock-shaft, Q², Figs. 2 and 3, supported in suitable bearings, and provided with the short arms R² and S², and with the long arms T² and U², respectively. The shorter arm, R², has in its forked upper end a roller, V², which is intended at the proper intervals to roll into the depression W², Figs. 2 and 4, in the cam X² on the shaft N'. The longer arms, T² and U², are secured in each instance, at their lower and slotted ends by a stud or pin, Y², to a forwarder, L², and the two forwarders are operated back and forth by the said long arms on the table C², in suitable ways, as shown. The cam X² is so timed that the forwarders move both back and forth during every second depression of the cross-head, as hereinafter explained. The said forwarders, which are made preferably of metal, and in the form as shown in Figs. 2, 3, and 7, are bent inwardly near their central portion, so as to form a shoulder or rest for the end piece next to be moved forward for nailing. The forwarders—one on each side of the table C²— are used in conveying the end pieces from the special support or rest F², forward onto the end-piece carriers D², the rear portions of the forwarders preventing the other end pieces from sliding down the support F² meanwhile. At the other end of the rock-shaft Q² from the short arm R² is the other short arm, S², to which is fastened one end of a spiral spring, Z², which is secured at its other end to the frame A, the purpose of such spring being to force the roller V² into the depression W² at the proper intervals. The end pieces, when brought forward by the forwarders L², are pushed by the latter into the carriers D², which latter are formed, preferably, of metal, and which slide back and forth on the table C² in suitable ways, such motion being directly communicated to them by the cams Y' and the spring E², which operate on the projections A², extending down through slots B² in the table C². The said carriers—there being one on each side of the table—are formed with a base, $h$, and with an upright part, $i$, as in Figs. 6 and 10, the purpose of the upright part being to hold the end piece in position and against a shoulder of the back plate, M². Such carriers are also each provided with an adjustable stop, $j$, in the form of an L, which limits the position of the end piece on the carrier lengthwise. The adjustment of such stop $j$ is made by means of the set-screw A³, which passes through the slots B³ in the said stop $j$, and screws into the upright part $i$, as shown in Fig. 10, the carriers being thus rendered capable of use with the machine in nailing boxes of different sizes, and in which the end pieces are of different lengths. The flat base of the end-piece carrier is intended to be of the same thickness as the side piece of the box or box-frame to be nailed.

The operation of my box-nailing machine is as follows: The end pieces of the boxes to be formed having been first placed on the special rest or support F², provided for them, the machine being at rest, with the cross-head elevated, and the carriers, each containing one of the aforesaid end pieces in proper position for the side piece of the box, to be nailed to such end pieces, and the latter being held up against the back plate, M², and against the shoulders N² of the said back plate, and with the end-piece forwarders back in proper position to push forward the end pieces for another box, the operator places on top of the end pieces in the carriers the side piece to be nailed thereto, such side piece being held in position by the nail-boxes, (the under sides of which are so formed as to serve as guides,) and then quickly and strongly presses his foot for an instant on the end of the foot-piece E, thus depressing it, and, by means of the connecting-rod G and the rock-shaft H, together with its arms J and K, causing the friction-pulley to push or press into the conical recess in the driving-pulley, and the roller M, in the end of the arm J, to be thrown out of the depression O in the cam N. The friction-pulley, bound by friction to the driving-pulley, which has meanwhile been set in motion by the driving power, is caused to revolve, and, revolving, turns with it the shaft B, which in its turn revolves the pinion P, which latter causes the cog-wheel Q to revolve. The motion of the said cog-wheel Q causes the pitman U to have a reciprocating motion, which latter motion is communicated to the rocker-arm T, the rock-shaft V, the rocker-arm W, and the segmental gear Z. The motion of the rocker-arm W causes the link X, together with the link D', to which similar motion is meanwhile communicated by means of the other segmental gear, A', operating in unison with the segmental gear Z, and by means of the rock-shaft B' and the rocker-arm C', to depress the cross-head. When the cross-head is depressed, the nail-punches suspended from it are forced down through the channels in the nail-boxes and drive the nails, which are supplied through tubes from a suitable nail-feeder, as before set forth. The nails having been driven, the cross-head is immediately caused to rise by the operation of the machine, and the carriers forced back into position to receive other pieces, the roller Q' in the end of the lever R' having meanwhile, and through the action of the spring $b$ and as the cross-head ascends, been forced into the depression P' in the cam O' on the shaft N', such depression having come opposite to such roller, and the other end of the lever having been thereby thrown forward, and acting through the intermediate link, T', rocker-arm W', and cam-rocking shaft X', causing the cams to rock up in front of the projections $A^2$, and so forcing back the end-piece carriers. After the cross-head has ascended the machine stops the roller M in the arm J, which roller has before been pressing, but not too tightly, against the surface of the cam N, having been forced into the depression O in such cam, and the friction-pulley forced out of the driving-pulley because of the force of the spring F, acting through the intermediate and connecting parts, which spring is released or allowed play to the extent of the depression O in the cam N. The cross-head being thus elevated, and the end-piece carriers out of the way, the operator turns the box-frame over and places on top the side piece to be nailed to the end pieces on that side, and then again sets the machine in motion by pressing the end of the foot-piece E, the cross-head being thus again caused to descend, and to nail on the other side piece. The flat bases of the end-piece carriers, being of the same thickness as the side piece of the box, the first side piece in the operating of nailing on the second side piece will occupy the space taken up by the bases of the carriers during the operation of nailing on the first and opposite side piece, thereby sufficiently elevating the box or box-frame with reference to the nail-boxes. While the cross-head has been descending the end-piece forwarders have been pulled forward, thus pushing the end pieces into the carriers, which at the time are stationary, and the said forwarders have then been forced back again, and all within the time occupied by the cross-head in its single descent. The said forwarders are thus forced back and forth by the action of the rock-shaft $Q^2$, the long arms $T^2$ and $U^2$, the short arms $R^2$ and $S^2$, and the roller $V^2$, operating on the cam $X^2$ through the force of the spring $Z^2$, which spring forces such roller into the depression $W^2$ when opposite the latter. On the other side of the machine from that shown in Fig. 2 the long arm $U^2$, like the long arm $T^2$, is secured at one end to the rock-shaft $Q^2$, which latter extends from one side of the machine to the other and operates the forwarder on that side of the machine. The second side piece having been nailed to the box-frame the cross-head again ascends, and while ascending the box-frame is pulled forward by the operator out of the way of the two carriers, which in the course of the ascent of such cross-head are again brought into proper position on the table for a side piece to be nailed to the end pieces carried in them. The operation of thus nailing on side pieces may be continued indefinitely, or so long as end pieces are supplied to the special support or rest provided for them.

In forming boxes differing in height, and in which the end pieces are longer in some cases than in others, the position of the L-shaped stops $j$ of the carriers is adjusted lengthwise of the carriers in each case, so as to hold the end piece of the box in proper position on each carrier, and the position of the nail-boxes is likewise adjusted on the supporting-bar by means of set-screws, the position of the nail-punches on the cross-head being at the same time adjusted so as to correspond with the position of the nail-boxes, from the channels of which latter the nail-punches are not wholly withdrawn.

In forming boxes differing in length the position of the shoulders on the black plate is adjusted accordingly, and the position of the nail-boxes, as well as that of the nail-punches on the cross-head, is also adjusted.

In forming boxes differing in width the table may be elevated or depressed, as may be necessary, in order to bring the box or box-frame into proper position with reference to the nail-boxes, the connecting parts of the forwarders and carriers allowing of such elevation or depression through the connecting-slots and adjustable pivots without interfering with the operation of such forwarders and carriers or that of the machine itself.

If it is desired to nail on the top or bottom pieces of the box, the shaft N', which controls the movements of the carriers and forwarders, may be thrown out of gear in any well-known way and the shoulders removed from the back-plate. The top or bottom piece may then be nailed on, first elevating or depressing the table, as the case may be, if necessary. In thus nailing on the top or bottom pieces, the nail-boxes formed as they are on their under sides, so as to act as guides, will also serve to hold the box or box-frame or the different parts thereof in proper position during the operation of nailing.

In the practice of my invention I do not limit myself to the exact construction of box-nailing machine herein shown and described, nor to the exact forms of the special devices herein shown and described, and for which I am desirous of securing Letters Patent.

What I claim as my invention, and desire to secure by Letters Patent, is—

1. The combination, with a box-nailing machine, of a support for the box or box-frame and nail-boxes, formed with a shoulder on their under side to act as guides for the box or box-frame resting on such support, substantially as set forth.

2. The combination, with a box-nailing machine for nailing both ends of the box or box-frame at the same instant and by one operation, of a support for the box or box-frame and two opposite sets or series of nail-boxes, formed with a shoulder on their under side to act as guides for the box or box-frame resting on such support, substantially as set forth.

3. The combination, in a box-nailing machine for nailing both ends of the box or box-frame at the same instant and by one operation, of a support for the box or box-frame, a reciprocating cross-head provided at or near each end with a set or series of nail-punches extending from the front to the rear of the machine, mechanism, substantially as described, for adjusting the two sets or series of nail-punches along the length of the cross-head, and nail-boxes adjustable as to their positions so as to co-operate with the nail-punches, substantially as and for the purpose set forth.

4. The combination, in a box-nailing machine for nailing both ends of the box or box-frame at the same instant and by one operation, of a vertically-reciprocating cross-head provided at or near each end with a set or series of nail-punches arranged in a line running from the front to the rear of the machine, substantially as shown, and adjustable along the length of the cross-head, substantially as set forth, two opposite sets or series of nail-boxes, adjustable as to their position, so as to co-operate with the two adjustable sets or series of nail-punches, a vertically-adjustable table to support the box or box-frame, and a back plate arranged at the back of the table and extending between and at one side of the two opposite sets or series of nail-boxes, substantially as set forth.

5. The combination, with a box-nailing-machine for nailing both ends of the box or box-frame at the same instant and by one operation, of the special end-piece support or rest $F^2$, constructed and arranged substantially as set forth.

6. The combination, with a box-nailing machine for nailing both ends of the box or box-frame at the same instant and by one operation, of the forwarders, constructed substantially as set forth, together with their operating mechanism, to convey the end-pieces of the box forward from the special support or rest provided for such end pieces at the back of the table.

7. The combination, with a box-nailing machine for nailing both ends of the box or box-frame at the same instant and by one operation, of the forwarders and carriers, constructed substantially as set forth, together with their operating mechanism, to convey the end pieces of the box from the special rest or support provided for such end pieces into position on the table for nailing.

8. In a box-nailing machine, the end-piece carriers $D^2$, formed with the stops $j$, substantially as set forth.

JOSEPH H. SWIFT.

Witnesses:
GEO. H. EVANS,
GEO. W. MIATT.